US011583835B2

(12) United States Patent
Chen et al.

(10) Patent No.: US 11,583,835 B2
(45) Date of Patent: Feb. 21, 2023

(54) NICKEL-IRON ALLOY HYDROGENATION CATALYST AND FABRICATING METHOD THEREOF

(71) Applicant: National Cheng Kung University, Tainan (TW)

(72) Inventors: Chuh-Yung Chen, Tainan (TW); Cheng-Chien Wang, Tainan (TW); Po-Wei Lan, Tainan (TW); Ying-Ji Lin, Tainan (TW)

(73) Assignee: National Cheng Kung University, Tainan (TW)

( * ) Notice: Subject to any disclaimer, the term of this patent is extended or adjusted under 35 U.S.C. 154(b) by 0 days.

(21) Appl. No.: 17/029,281

(22) Filed: Sep. 23, 2020

(65) Prior Publication Data

US 2021/0113999 A1  Apr. 22, 2021

(51) Int. Cl.
| | | |
|---|---|---|
| *B01J 23/755* | (2006.01) | |
| *B01J 35/02* | (2006.01) | |
| *B01J 35/10* | (2006.01) | |
| *B01J 37/16* | (2006.01) | |
| *B01J 37/34* | (2006.01) | |

(52) U.S. Cl.
CPC ........... *B01J 23/755* (2013.01); *B01J 35/026* (2013.01); *B01J 35/1009* (2013.01); *B01J 35/1014* (2013.01); *B01J 37/16* (2013.01); *B01J 37/342* (2013.01)

(58) Field of Classification Search
None
See application file for complete search history.

(56) References Cited

PUBLICATIONS

Mohamed, Facile directing agent-free synthesis and magnetism of nanocrystalline Fi-Ni alloy with tunable shape, Materials Science and Engineering B, 2014, 7-12 (Year: 2014).*
Ferreo et al., Influence of shape, size and magnetostatic interactions on the hyperthermia properties of permalloy nanostructure, Nature Scientific Reports, Apr. 2019, 9, 6591 (Year: 2019).*
Koike, A highly active and coke-resistant steam reforming catalyst comprising uniform nickel-iron alloy nanoparticles, ChemSusChem, 2012, 5, 2312-2314 (Year: 2012).*
Lee at al., Synthesis and characterization of spherical nano Ni(1-x)-M (M-Co, Fe) alloy powder for SOFC anode, Journal of the Korean Ceramic Society, 2014, 51, 367-373 (Year: 2014).*
Ching-Wen Chen, Chuh-Yung Chen, Yao-Hui Huang Method of preparing Ru-immobilized polymer-supported catalyst for hydrogen generation from NaBH4 solution.
C.L. Hsueh, Y.H. Huang, C.Y. Chen Novel activated alumina-supported iron oxide-composite as a heterogeneous catalyst for photooxidative degradation of reactive black 5.

* cited by examiner

*Primary Examiner* — Coris Fung
*Assistant Examiner* — Keling Zhang
(74) *Attorney, Agent, or Firm* — Mark M. Friedman (57) ABSTRACT

A nickel-iron alloy hydrogenation catalyst and a fabricating method thereof are provided. The nickel-iron alloy hydrogenation catalyst has 65 to 95 atomic percent nickel; and 5 to 35 atomic percent of iron, wherein the nickel-iron alloy hydrogenation catalyst is spherical and has an average particle diameter of 180 to 300 nm. The nickel-iron alloy hydrogenation catalyst is present in a non-carrier form. The nickel-iron alloy hydrogenation catalyst can generate a hydrogenation reaction at a low temperature (about 130~140° C.) and has a high conversion rate (compared to pure nickel catalyst).

15 Claims, 9 Drawing Sheets

NICKEL-IRON ALLOY HYDROGENATION CATALYST AND FABRICATING METHOD THEREOF

CROSS REFERENCE TO RELATED APPLICATION

This application claims priority to Taiwan Patent Application No. 108137741, filed on Oct. 18, 2019, which is incorporated herein by reference in its entirety.

FIELD OF DISCLOSURE

The present disclosure relates to a hydrogenation catalyst and a fabricating method thereof, and more particularly to a nickel-iron alloy hydrogenation catalyst and a fabricating method thereof.

BACKGROUND OF DISCLOSURE

There have been many studies on catalysts. For example, an article published in the International Journal of Hydrogen Energy in March 2009, entitled "method of preparing Ru-immobilized polymer-supported catalyst for hydrogen generation from $NaBH_4$ solution" (Chen et al.). Or, an article published in the journal of hazardous materials in February 2006, titled "novel activated alumina-supported iron oxide-composite as a heterogeneous catalyst for photooxidative degradation of reactive black 5" (Hsueh et al.).

For technologies that convert carbon monoxide or carbon dioxide into alkanes, nickel metal is generally used as a catalyst. However, in the hydrogenation reaction using nickel metal as a catalyst, a conversion rate of carbon monoxide or carbon dioxide is low, and it is often necessary to increase the conversion rate by increasing temperature. In addition, in the hydrogenation reaction of carbon monoxide, a selectivity of long-chain alkanes (such as ethane or propane) is not good, that is, methane is easily generated.

Therefore, it is necessary to provide a hydrogenation catalyst and a fabricating method thereof to solve the problems existing in the conventional technology.

SUMMARY OF DISCLOSURE

An object of the present disclosure is to provide a nickel-iron alloy hydrogenation catalyst, which has a specific alloy composition, a specific shape, and a specific average particle size, and is present in a non-carrier form (i.e., without a carrier), such that the nickel-iron alloy hydrogenation catalyst can generate a hydrogenation reaction at a low temperature (for example, about 130-140° C.) and has a high conversion rate (relative to pure nickel catalyst). Further, in a case of a hydrogenation reaction of carbon monoxide, use of the nickel-iron alloy hydrogenation catalyst has a relatively high selectivity (compared to pure nickel catalyst) for long-chain alkanes (such as ethane or propane).

Another object of the present disclosure is to provide a fabricating method of a nickel-iron alloy hydrogenation catalyst, which uses a redox method to synthesize the nickel-iron alloy hydrogenation catalyst of the present disclosure.

To achieve the above object, the present disclosure provides a nickel-iron alloy hydrogenation catalyst, comprising: 65 to 95 atomic percent nickel; and 5 to 35 atomic percent of iron, wherein the nickel-iron alloy hydrogenation catalyst is spherical and has an average particle diameter of 180 to 300 nm, and the nickel-iron alloy hydrogenation catalyst is present in a non-carrier form.

In an embodiment of the present disclosure, a number of active sites of the nickel-iron alloy hydrogenation catalyst is between 10 and 20 micromoles/gram.

In an embodiment of the present disclosure, a specific surface area of the nickel-iron alloy hydrogenation catalyst is between 3 and 10 $m^2/g$.

In an embodiment of the present disclosure, the nickel-iron alloy hydrogenation catalyst further comprises: 75 to 85 atomic percent nickel; and 15 to 25 atomic percent of iron.

In an embodiment of the present disclosure, the average particle diameter of the nickel-iron alloy hydrogenation catalyst is between 180 and 225 nm.

In an embodiment of the present disclosure, a number of active sites of the nickel-iron alloy hydrogenation catalyst is between 19 and 20 micromoles/gram.

In an embodiment of the present disclosure, a specific surface area of the nickel-iron alloy hydrogenation catalyst is between 5 and 6 $m^2/g$.

Another object of the present disclosure is to provide a fabricating method of a nickel-iron alloy hydrogenation catalyst, comprising steps of: adding a nickel salt precursor and an iron salt precursor to an aqueous solution to form a nickel-iron ion aqueous solution; adding a reducing agent to the nickel-iron ion aqueous solution to form a reaction solution; and performing a synthesis reaction of applying a magnetic field of 200 Gauss or more at a reaction temperature between 70 and 100° C. to form the nickel-iron alloy hydrogenation catalyst according to any one of embodiments described above.

In an embodiment of the present disclosure, the magnetic field is between 200 and 3000 Gauss.

In an embodiment of the present disclosure, the reducing agent is hydrazine.

In an embodiment of the present disclosure, the nickel salt precursor is at least one of $NiCl_2 \cdot 6H_2O$, $NiSO_4$, and $Ni(CH_3COO)_2$, and the iron salt precursor is at least one of $(NH_4)_2Fe(SO_4)_2 \cdot 6H_2O$, $[FeCl_2(H_2O)_4]Cl \cdot 2H_2O$, and $Fe_2(SO_4)_3$.

DETAILED DESCRIPTION OF PREFERRED EMBODIMENTS

The structure and the technical means adopted by the present disclosure to achieve the above and other objects can be best understood by referring to the following detailed description of the preferred embodiments and the accompanying drawings. Furthermore, directional terms described by the present disclosure, such as upper, lower, front, back, left, right, inner, outer, side, longitudinal/vertical, transverse/horizontal, and etc., are only directions by referring to the accompanying drawings, and thus the used directional terms are used to describe and understand the present disclosure, but the present disclosure is not limited thereto.

In an embodiment of the present disclosure, a nickel-iron alloy hydrogenation catalyst comprises: 65 to 95 atomic percent nickel; and 5 to 35 atomic percent of iron. In an embodiment, a ratio of nickel to iron in the nickel-iron alloy hydrogenation catalyst of the embodiment of the present disclosure is, for example, 70%: 30%, 80%: 20%, or 90%: 10%. In one embodiment, the nickel-iron alloy hydrogenation catalyst of the embodiment of the present disclosure is fabricated by a redox method. In an example, the reducing agent used in the redox method is, for example, hydrazine, that is, the nickel-iron alloy hydrogenation catalyst of the embodiment of the present disclosure can be fabricated by a hydrazine reduction method. It is noted that the nickel-iron alloy hydrogenation catalyst fabricated using the redox method does not have a carrier, where nickel together with iron will form an alloy phase. In addition, the nickel-iron alloy hydrogenation catalyst is spherical and has an average particle size between 180 and 300 nanometers. In another embodiment, in the case where the nickel-iron alloy hydrogenation catalyst contains 75 to 85 atomic percent nickel and 15 to 25 atomic percent iron, the average particle size is between 180 and 225 nanometers.

In an embodiment, a number of active sites of the nickel-iron alloy hydrogenation catalyst is between 10 and 20 micromoles/gram. The number of active sites refers to a number of catalytic capacity and binding sites in the catalyst. Therefore, the number of active sites is roughly positively related to an activity of the catalyst. In another embodiment, in the case where the nickel-iron alloy hydrogenation catalyst comprises 75 to 85 atomic percent nickel and 15 to 25 atomic percent iron, the number of active sites is between 19 and 20 micromoles/gram.

In an embodiment, a specific surface area of the nickel-iron alloy hydrogenation catalyst is between 3 and 10 $m^2/g$. In general, an activity of a catalyst with a high specific surface area is higher than that of a catalyst with a low specific surface area. Therefore, the specific surface area is roughly positively related to the activity of the catalyst. In another embodiment, in the case where the nickel-iron alloy hydrogenation catalyst contains 75 to 85 atomic percent nickel and 15 to 25 atomic percent iron, the number of active sites is between 5 and 6 $m^2/g$.

It is noted that, the nickel-iron alloy hydrogenation catalyst of the embodiment of the present disclosure mainly has characteristics of having a specific alloy composition, having a specific shape (spherical shape), having a specific average particle diameter, and having no carrier, such that the nickel-iron alloy hydrogenation catalyst can generate a hydrogenation reaction at a low temperature (for example, about 130-140° C.) and has a high conversion rate (relative to pure nickel catalyst). Further, in a case of a hydrogenation reaction of carbon monoxide, use of the nickel-iron alloy hydrogenation catalyst has a relatively high selectivity (compared to pure nickel catalyst) for long-chain alkanes (such as ethane or propane). Detailed experimental data and analysis results are detailed in following paragraphs.

Figure 1:
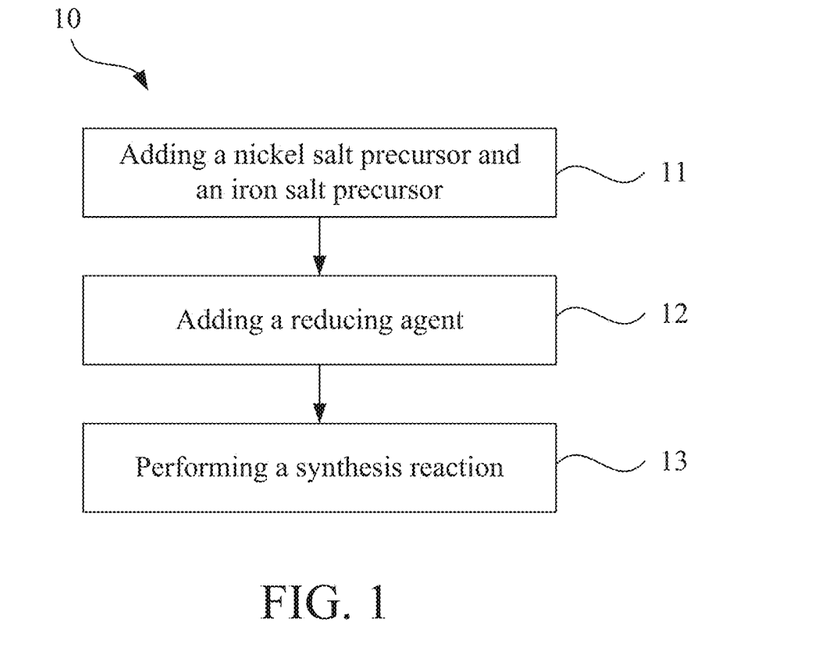
FIG. 1 is a schematic flow chart of a fabricating method of a nickel-iron alloy hydrogenation catalyst according to an embodiment of the disclosure.

Referring to FIG. 1, a fabricating method of a nickel-iron alloy hydrogenation catalyst according to an embodiment of the present disclosure mainly includes following steps 11 to 13 of: adding a nickel salt precursor and an iron salt precursor to an aqueous solution to form a nickel-iron ion aqueous solution (step 11); adding a reducing agent to the nickel-iron ion aqueous solution to form a reaction solution (step 12); and performing a synthesis reaction of applying a magnetic field of 200 Gauss or more at a reaction temperature between 70 and 100° C. to form the nickel-iron alloy hydrogenation catalyst according to any one of embodiments of the present disclosure (step 13). Details of the implementation and principles of the above-described steps of embodiments will be described in detail below.

In an embodiment of the present disclosure, the fabricating method 10 of the nickel-iron alloy hydrogenation catalyst has a step 11 of: adding a nickel salt precursor and an iron salt precursor to an aqueous solution to form a nickel-iron ion aqueous solution. In the step 11, an amount of nickel salt precursor and an iron salt precursor are adjusted according to an atomic percentage of nickel and iron of the nickel-iron alloy hydrogenation catalyst to be formed. In an embodiment, the nickel salt precursor is at least one of $NiCl_2.6H_2O$, $NiSO_4$, and $Ni(CH_3COO)_2$, and the iron salt precursor is at least one of $(NH_4)_2Fe(SO_4)_2.6H_2O$, $[FeCl_2(H_2O)_4]Cl.2H_2O$ and $Fe_2(SO_4)_3$. It should be additionally mentioned that the aforementioned nickel salt precursors and iron salt precursors are only examples. In an example, any kind of nickel salt precursors and iron salt precursors commonly used in the industry may be used. In another embodiment, other adjuvants can also be added to the aqueous solution, for example, carboxymethyl cellulose (CMC), sodium citrate, sodium hydroxide, or a mixture thereof. In one example, sodium hydroxide can be used to adjust the pH. In another example, carboxymethyl cellulose can be used to adjust the viscosity of the reaction solution. In yet another example, sodium citrate is used to chelate metal ions so that the metal ions can be reduced and produce a homogeneous alloy.

In an embodiment of the present disclosure, the fabricating method 10 of the nickel-iron alloy hydrogenation catalyst has a step 12 of: adding a reducing agent to the nickel-iron ion aqueous solution to form a reaction solution. In this step 12, the reducing agent is, for example, hydrazine.

In a specific example, the weight parts used for the above components are as follows: an aqueous solution is 10,000 to 15,000 parts by weight; a total of the nickel salt precursor and the iron salt precursor is 1000 to 1500 parts by weight (adjusted according to the atomic percentage of nickel and iron of the nickel-iron alloy hydrogenation catalyst to be formed); the acid methyl cellulose is 50 to 100 parts by weight (in the case of an auxiliary agent); the sodium citrate is 1500 to 2000 parts by weight (in the case of an auxiliary agent); the sodium hydroxide is 200 to 500 parts by weight (in the case of an auxiliary agent); and the hydrazine is 1000 to 1500 parts by weight.

In an embodiment of the present disclosure, the fabricating method 10 of the nickel-iron alloy hydrogenation catalyst has a step 13 of: performing a synthesis reaction of applying a magnetic field of 200 Gauss or more at a reaction temperature between 70 and 100° C. to form the nickel-iron alloy hydrogenation catalyst according to any one of embodiments of the present disclosure. In the step 13, the magnetic field is mainly used to assist in the formation of nickel-iron alloy hydrogenation catalyst. In one embodiment, the synthesis reaction time is between 2 and 10 hours, such as 3, 4, 5, 6, 7, 8, or 9 hours.

From above, the fabricating method of the nickel-iron alloy hydrogenation catalyst according to an embodiment of the present disclosure is mainly to form the nickel-iron alloy hydrogenation catalyst by a redox method. The nickel-iron alloy hydrogenation catalyst does not have a carrier, and nickel together with iron will form an alloy phase. In addition, the nickel-iron alloy hydrogenation catalyst is spherical and has an average particle size between 180 and 300 nanometers. The nickel-iron alloy hydrogenation catalyst formed by the fabricating method of the nickel-iron alloy hydrogenation catalyst according to an embodiment of the present disclosure has characteristics of having a specific alloy composition, having a specific shape (spherical shape), having a specific average particle diameter, and having no carrier, such that the nickel-iron alloy hydrogenation catalyst can generate a hydrogenation reaction at a low temperature (for example, about 130-140° C.) and has a high conversion rate (relative to pure nickel catalyst). Further, in a case of a hydrogenation reaction of carbon monoxide, use of the nickel-iron alloy hydrogenation catalyst has a relatively high selectivity (compared to pure nickel catalyst) for long-chain alkanes (such as ethane or propane). Detailed experimental data and analysis results are detailed in following paragraphs.

Hereinafter, it will be described that each of the embodiments obtained by using the fabricating method of the nickel-iron alloy hydrogenation catalyst of the embodiments of the present disclosure has the above-mentioned effects.

Embodiment 1

According to the desired nickel-iron alloy hydrogenation catalyst with an atomic percentage of nickel and iron being 90%: 10%, an appropriate amount of $NiCl_2 \cdot 6H_2O$ and $(NH_4)_2Fe(SO_4)_2 \cdot 6H_2O$ are added into an aqueous solution of 13000 parts by weight, so as to form a nickel-iron ion aqueous solution. In addition, 50 to 100 parts by weight of carboxymethyl cellulose, 1500 to 2000 parts by weight of sodium citrate, and 200 to 500 parts by weight of sodium hydroxide are added into the aqueous solution, where the sodium hydroxide mainly adjusts the pH value of the aqueous solution to about 14.

Then, 1000 to 1500 parts by weight of a reducing agent (hydrazine) is added into the nickel-iron ion aqueous solution to form a reaction solution. After that, a synthesis reaction is performed, and a magnetic field greater than 200 Gauss is applied to the reaction solution at a reaction temperature between 70 and 100° C. for 2 to 10 hours, so as to form the nickel-iron alloy hydrogenation catalyst of embodiment 1.

Embodiments 2 and 3

The fabricating method of embodiments 2 and 3 are substantially the same as the fabricating method of embodiment 1, except for the difference in the amounts of $NiCl_2 \cdot 6H_2O$ and $(NH_4)_2Fe(SO_4)_2 \cdot 6H_2O$ used. In detail, the atomic percentage of nickel and iron of the nickel-iron alloy hydrogenation catalyst to be formed in embodiment 2 is 80%: 20%, and the atomic percentage of the nickel and iron atoms of the nickel-iron alloy hydrogenation catalyst to be formed in embodiment 3 is 70%: 30%.

Figure 2A:
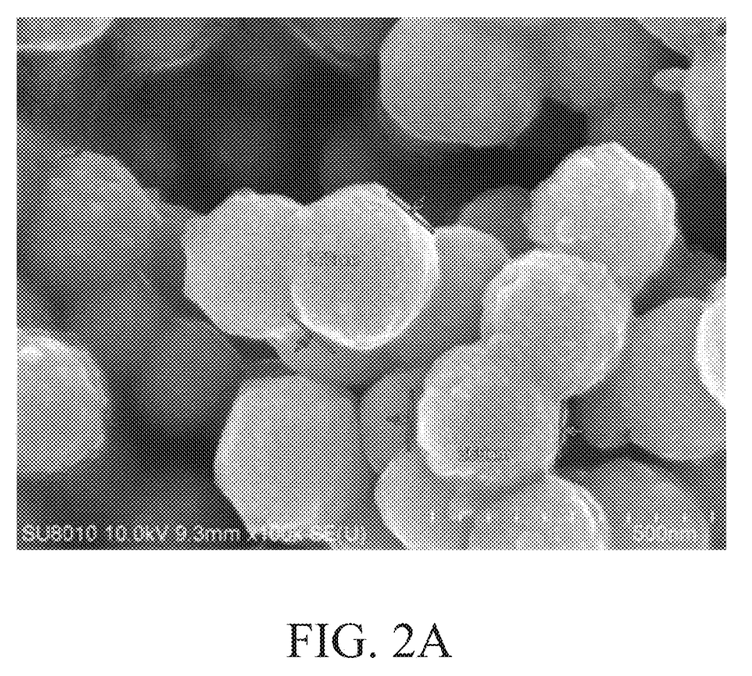
FIG. 2A to FIG. 2C are electron microscope photographs of embodiments 1 to 3, respectively.
Figure 2B:
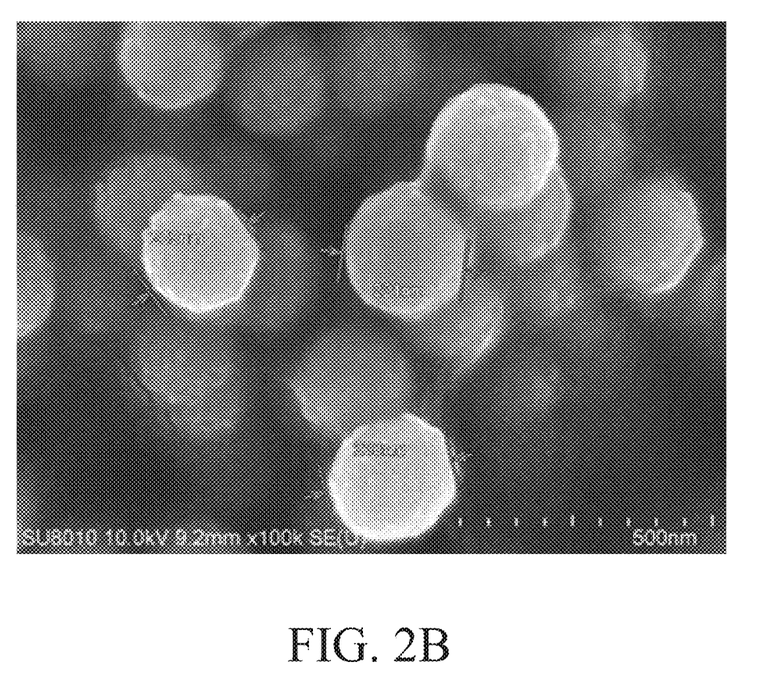
Figure 2C:
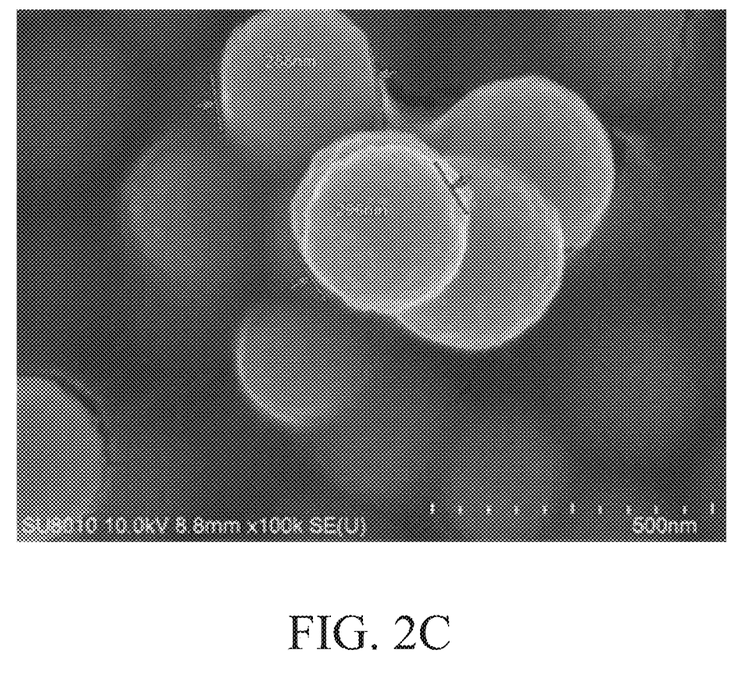

First, embodiments 1 to 3 are analyzed with an electron microscope, which uses a commercially available electron microscope to analyze embodiments 1 to 3. Refer to FIGS. 2A to 2C, which are electron microscope photographs of embodiments 1 to 3, respectively. As can be seen from FIGS. 2A to 2C, an average particle size of embodiment 1 is between 225 and 280 nm, an average particle size of embodiment 2 is between 185 and 225 nm, and an average particle size of embodiment 3 is between 250 and 300 nanometers.

Next, embodiments 1 to 3 are analyzed for the number of active sites, degree of dispersion, specific surface area, and crystal size, mainly by carbon monoxide pulse titration and commercially available instruments. The analysis results are shown in Table 1 below. In addition, the above analysis is also performed on pure nickel. According to the analysis results, it can be seen that embodiments 1 to 3 have a higher number of active sites, degree of dispersion, and specific surface area than pure nickel, so the catalytic activity of embodiments 1 to 3 is superior to pure nickel

TABLE 1

|  | number of active sites (umole/g) | degree of dispersion ×10$^{-3}$ | specific surface area (m$^2$/g) | crystal size (nm) |
| --- | --- | --- | --- | --- |
| Embodiment 1 (Ni9Fe1) | 15.19 | 0.89 | 9.5 | 20.6 |
| Embodiment 2 (Ni8Fe2) | 19.59 | 1.14 | 5.4 | 13.4 |
| Embodiment 3 (Ni7Fe3) | 10.16 | 0.59 | 3.7 | 13.2 |
| Pure nickel | 14.86 | N/A | 3.3 | 24.3 |

It is worth mentioning that embodiment 1 has a higher specific surface area (compared to embodiment 2). However, since the number of active sites is directly related to the active center of the catalyst, embodiment 2 has a higher catalyst activity than embodiment 1. Refer to FIG. 2A, according to a further analysis, since the surface of embodiment 1 has more protrusions, embodiment 1 has a relatively high specific surface area.

In addition, embodiments 1 to 3 have a smaller grain size than pure nickel, and as the iron content increases, the grain size decreases. When the iron content is increased to a certain percentage, the grain size decreases significantly (e.g. embodiment 2). The smaller the grain size, the more contact interfaces can be formed, which generally helps to improve the activity and selectivity of the catalyst.

Figure 3:
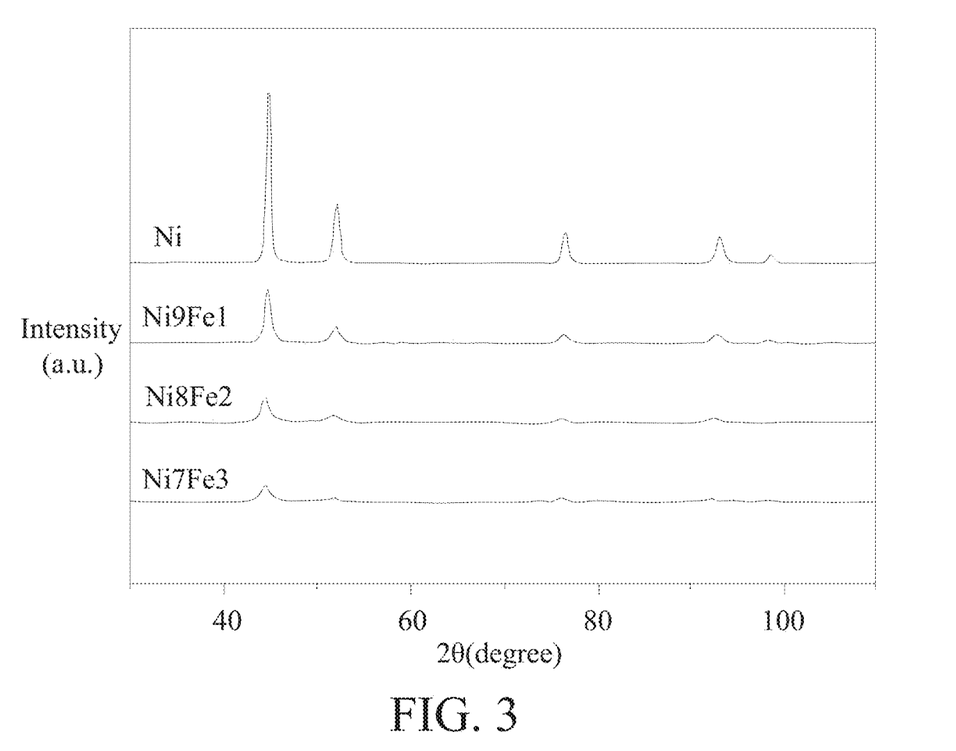
FIG. 3 is a schematic diagram of X-ray diffraction (XRD) analysis of embodiments 1 to 3.

Next, embodiments 1 to 3 and pure nickel are analyzed using a commercially available X-ray diffraction instrument, and results are shown in FIG. 3. It can be seen from FIG. 3 that a number of diffraction peaks of embodiments 1 to 3 is consistent with that of pure nickel. According to the results, only the face-centered cubic (FCC) phase is detected in embodiments 1 to 3 and pure nickel. Presumably, this is because the iron content of embodiments 1 to 3 is low, so the crystal phase of nickel will be the main one (the atomic arrangement of nickel is FCC structure). In addition, as can be seen from FIG. 3, with an increase in iron content, the diffraction peaks of the (111) crystal plane and the (200) crystal plane are shifted (from FIG. 3, as the iron content rises, it leans to the left). According to the principle of X-ray diffraction analysis, this is because nickel and iron form a homogeneous alloy. This shows that embodiments 1 to 3 are all alloy phases.

From above, the addition of iron can not only reduce the grain size to improve the activity and selectivity of the catalyst, but the iron can also form an alloy phase with nickel to produce a synergy effect between iron and nickel, thereby improving the adsorption performance and activity of the catalyst.

Figure 4A:
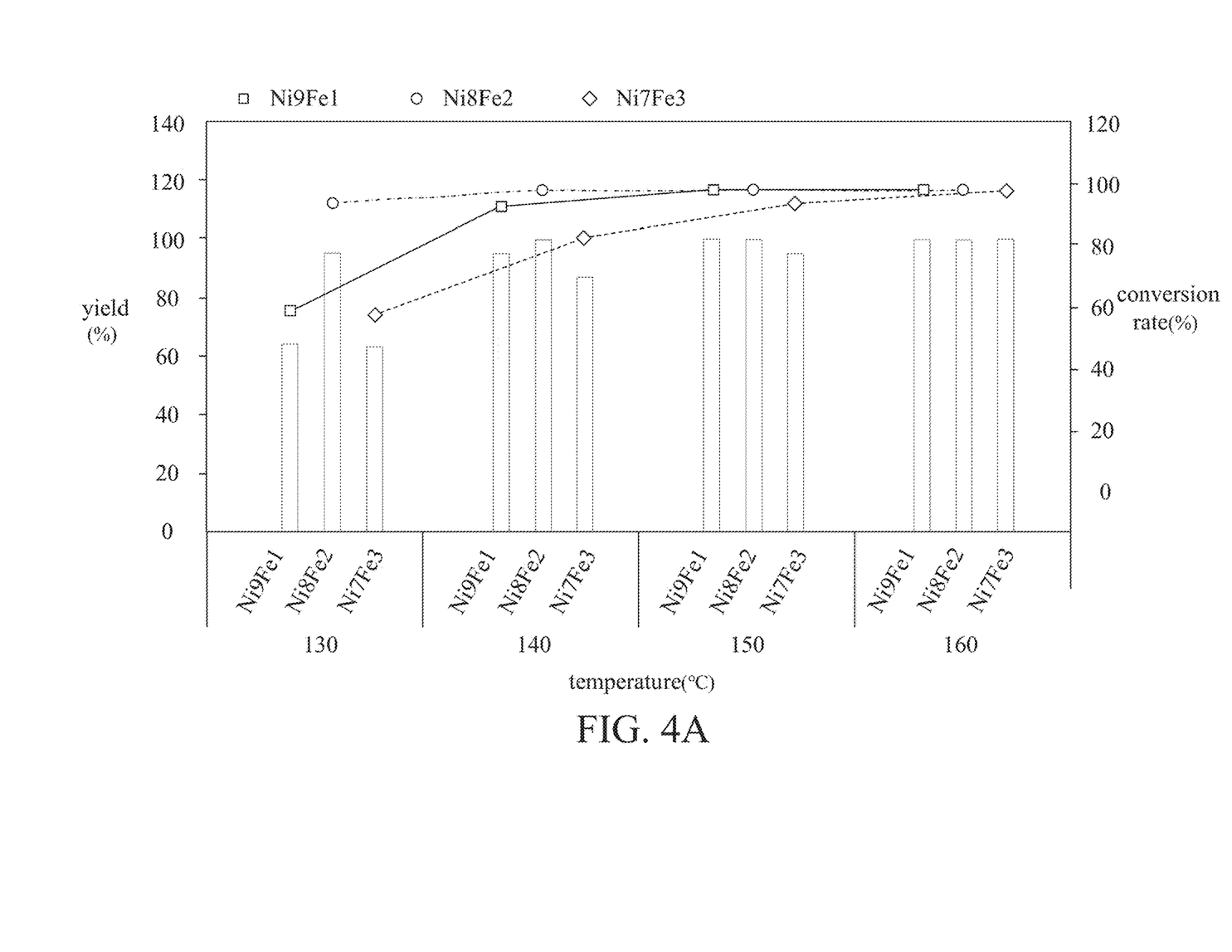
FIG. 4A is a product analysis diagram after performing a hydrogenation reaction of carbon dioxide by using embodiments 1 to 3 as a catalyst.

Next, the product analysis after carbon dioxide hydrogenation reaction using embodiments 1 to 3 as a catalyst is shown in FIG. 4A, which is the product analysis diagram after carbon dioxide hydrogenation reaction using embodiments 1 to 3 as a catalyst. Embodiment 2 has a conversion rate of about 100% at about 130° C., and embodiments 1 and 3 have a conversion rate of about 85-95% at about 140° C. In addition, embodiments 1 to 3 all have a conversion rate of about 100% at about 150° C. Compared with the pure nickel having a conversion rate of only about 50% at 150° C., the nickel-iron alloy hydrogenation catalyst of the embodiment of the present disclosure has excellent activity at low temperatures. On the other hand, a yield in FIG. 4A refers to the percentage of each product. Generally speaking, most of the products of embodiments 1 to 3 are methane ($CH_4$), while ethane ($C_2H_6$) and propane ($C_3H_8$) are less, so yield of ethane ($C_2H_6$) and propane ($C_3H_8$) are not shown in FIG. 4A).

Figure 4B:
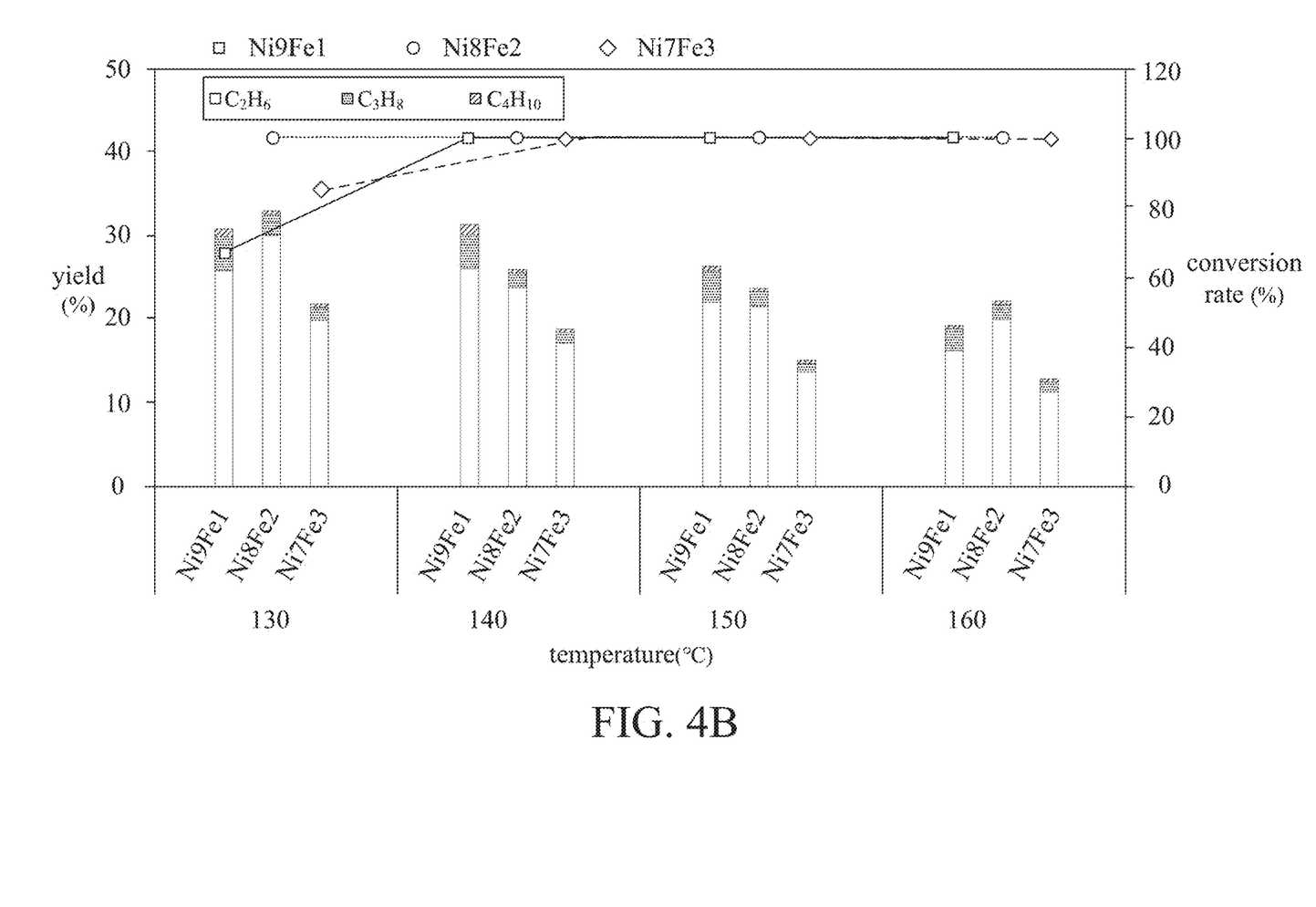
FIG. 4B is a product analysis diagram after performing a hydrogenation reaction of carbon monoxide by using embodiments 1 to 3 as a catalyst.

Next, a product analysis after the carbon monoxide hydrogenation reaction using embodiments 1 to 3 as the catalyst is shown in FIG. 4B, which is the product analysis diagram after the carbon monoxide hydrogenation reaction using embodiments 1 to 3 as the catalyst. Embodiment 2 has a conversion rate of about 100% at about 130° C., and embodiments 1 and 3 have a conversion rate of about 70 to 90% at about 140° C. In addition, embodiments 1 to 3 all have a conversion rate of about 100% at about 140° C. Compared with a conversion rate of only about 40% at 150° C. for pure nickel, the nickel-iron alloy hydrogenation catalyst of the embodiment of the present disclosure has excellent activity at low temperature. On the other hand, the yield in FIG. 4B refers to the yield (also known as $C_{2+}$ yield) of long-chain alkanes (i.e., ethane, propane, butane, etc.). Because the hydrogenation reaction of CO is mainly based on the yield of $C_{2+}$ to determine the quality of the reaction, it is not included in the yield of methane. As can be seen from FIG. 4B, compared to embodiments 1 and 3, embodiment 2 has the highest $C_{2+}$ yield at low temperature (about 130° C.). However, it is worth mentioning that the $C_{2+}$ yields of embodiments 1 to 3 meet commercial standards at low temperatures (about 130° C.) and far exceed the $C_{2+}$ yield of pure nickel (only 20% at 150° C.).

It should also be mentioned that although the use of a higher reaction temperature in the hydrogenation reaction can increase the conversion rate, it will reduce the overall $C_{2+}$ yield, as can be seen from FIG. 4B. Since the nickel-iron alloy hydrogenation catalyst of the embodiment of the present disclosure has high activity at low temperature, the hydrogenation reaction can be performed at low temperature, thereby improving the overall $C_{2+}$ yield.

Figure 5A:
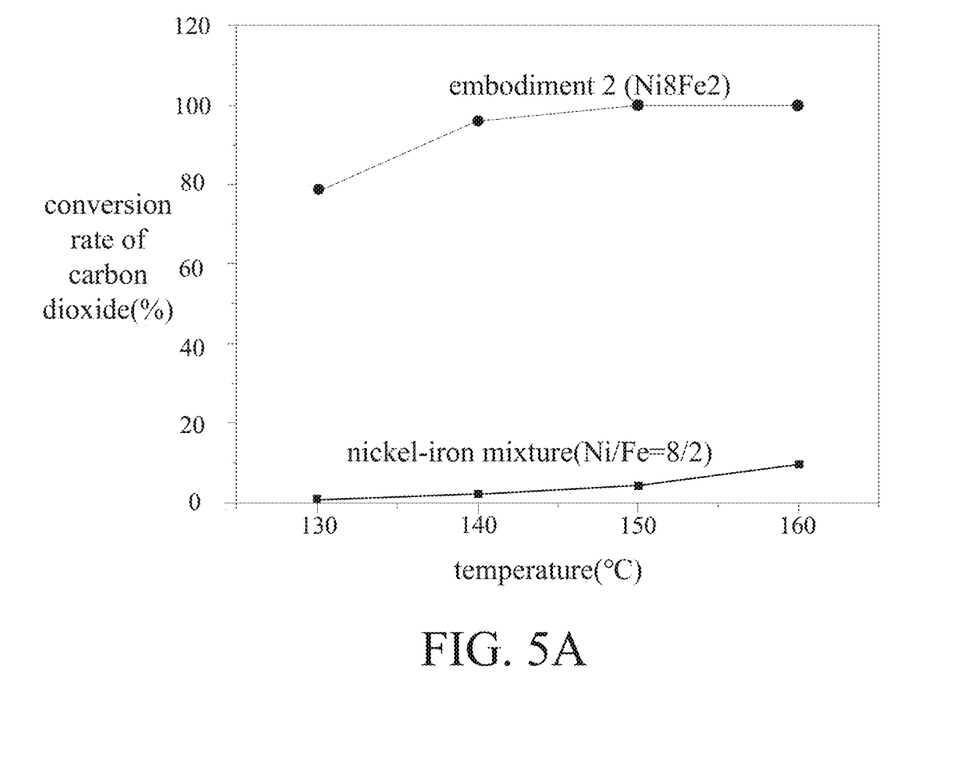
FIG. 5A is a schematic diagram of a conversion rate analysis after the hydrogenation reaction of carbon dioxide by using embodiment 2 and a nickel-iron mixture as a catalyst.

Next, the conversion rate after the hydrogenation reaction of carbon dioxide is analyzed using embodiment 2 and a nickel-iron mixture (nickel-iron atomic percentage of 80%: 20%, not having a nickel-iron alloy phase) as a catalyst. Referring to FIG. 5A, since the nickel-iron alloy hydrogenation catalyst of the embodiment of the present disclosure has an alloy phase (synergy effect), embodiment 2 has a better conversion rate than that of the nickel-iron mixture. From this, it can be seen that the same effect cannot be achieved only by mixing the same nickel-iron composition as in embodiment 2.

Figure 5B:
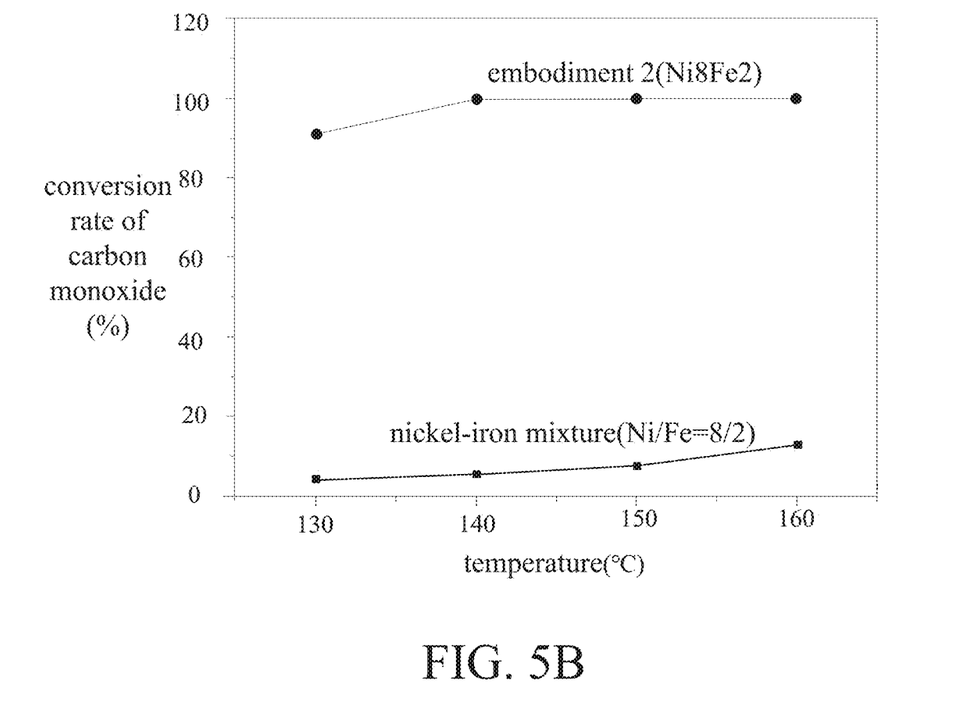
FIG. 5B is a schematic diagram of a conversion rate analysis after the hydrogenation reaction of carbon monoxide by using embodiment 2 and a nickel-iron mixture as a catalyst.

Next, the conversion analysis after the hydrogenation reaction of carbon monoxide is analyzed using embodiment 2 and a nickel-iron mixture (nickel-iron atomic percentage of 80%: 20%, not having a nickel-iron alloy phase) as a catalyst. Referring to FIG. 5B, since the nickel-iron alloy hydrogenation catalyst of the embodiment of the present disclosure has an alloy phase, compared with the nickel-iron mixture, embodiment 2 has a better conversion rate. From this, it can be seen that the same effect cannot be achieved only by mixing the same nickel-iron composition as in embodiment 2.

It is worth mentioning that the nickel-iron alloy hydrogenation catalyst of the embodiment of the present disclosure excludes the use of sintering, so it does not form a dendritic structure. Furthermore, the dendritic structure catalyst cannot produce all the effects of the nickel-iron alloy hydrogenation catalyst according to the embodiment of the present disclosure.

From above, a nickel-iron alloy hydrogenation catalyst according to an embodiment of the present disclosure has a specific alloy composition, a specific shape, and a specific average particle size, and is present in a non-carrier form (i.e., without a carrier), such that the nickel-iron alloy hydrogenation catalyst can generate a hydrogenation reaction at a low temperature (for example, about 130-140° C.) and has a high conversion rate (relative to pure nickel catalyst). Further, in a case of a hydrogenation reaction of carbon monoxide, use of the nickel-iron alloy hydrogenation catalyst has a relatively high selectivity (compared to pure nickel catalyst) for long-chain alkanes (such as ethane or propane).

The present disclosure has been described with a preferred embodiment thereof and it is understood that many changes and modifications to the described embodiment can be carried out without departing from the scope and the spirit of the disclosure that is intended to be limited only by the appended claims.

The invention claimed is:

1. A nickel-iron alloy hydrogenation catalyst, comprising:
   65 to 95 atomic percent nickel; and
   5 to 35 atomic percent of iron, wherein the nickel-iron alloy hydrogenation catalyst having a spherical shape and has an average particle diameter of 180 to 300 nm, and the nickel-iron alloy hydrogenation catalyst is in a form without a carrier,
   wherein a number of active sites of the nickel-iron alloy hydrogenation catalyst is between 10 and 20 micromoles/gram.

2. The nickel-iron alloy hydrogenation catalyst according to claim 1, wherein a specific surface area of the nickel-iron alloy hydrogenation catalyst is between 3 and 10 m$^2$/g.

3. The nickel-iron alloy hydrogenation catalyst according to claim 1, comprising: 75 to 85 atomic percent nickel; and 15 to 25 atomic percent of iron.

4. The nickel-iron alloy hydrogenation catalyst according to claim 3, wherein the average particle diameter of the nickel-iron alloy hydrogenation catalyst is between 180 and 225 nm.

5. The nickel-iron alloy hydrogenation catalyst according to claim 3, wherein a number of active sites of the nickel-iron alloy hydrogenation catalyst is between 19 and 20 micromoles/gram.

6. The nickel-iron alloy hydrogenation catalyst according to claim 3, wherein a specific surface area of the nickel-iron alloy hydrogenation catalyst is between 5 and 6 m$^2$/g.

7. A fabricating method of a nickel-iron alloy hydrogenation catalyst, comprising steps of:
   adding a nickel salt precursor and an iron salt precursor to an aqueous solution to form a nickel-iron ion aqueous solution;
   adding a reducing agent to the nickel-iron ion aqueous solution to form a reaction solution; and
   performing a synthesis reaction of applying a magnetic field of 200 Gauss or more at a reaction temperature between 70 and 100° C. to form the nickel-iron alloy hydrogenation catalyst according to claim 1.

8. The fabricating method of the nickel-iron alloy hydrogenation catalyst according to claim 7, wherein the magnetic field is between 200 and 3000 Gauss.

9. The fabricating method of the nickel-iron alloy hydrogenation catalyst according to claim 7, wherein the reducing agent is hydrazine.

10. The fabricating method of the nickel-iron alloy hydrogenation catalyst according to claim 7, wherein the nickel salt precursor is at least one of $NiCl_2.6H_2O$, $NiSO_4$, and $Ni(CH_3COO)_2$, and the iron salt precursor is at least one of $(NH_4)_2Fe(SO_4)_2.6H_2O$, $[FeCl_2(H_2O)_4]Cl.2H_2O$ and $Fe_2(SO_4)_3$.

11. The fabricating method of the nickel-iron alloy hydrogenation catalyst according to claim 7, wherein a specific surface area of the nickel-iron alloy hydrogenation catalyst is between 3 and 10 $m^2/g$.

12. The fabricating method of the nickel-iron alloy hydrogenation catalyst according to claim 7, further comprising: 75 to 85 atomic percent nickel; and 15 to 25 atomic percent of iron.

13. The fabricating method of the nickel-iron alloy hydrogenation catalyst according to claim 7, wherein an average particle diameter of the nickel-iron alloy hydrogenation catalyst is between 180 and 225 nm.

14. The fabricating method of the nickel-iron alloy hydrogenation catalyst according to claim 13, wherein a number of active points of the nickel-iron alloy hydrogenation catalyst is between 19 and 20 micromoles/gram.

15. The fabricating method of the nickel-iron alloy hydrogenation catalyst according to claim 13, wherein a specific surface area of the nickel-iron alloy hydrogenation catalyst is between 5 and 6 $m^2/g$.

* * * * *

UNITED STATES PATENT AND TRADEMARK OFFICE
CERTIFICATE OF CORRECTION

| | | |
|---|---|---|
| PATENT NO. | : 11,583,835 B2 | Page 1 of 1 |
| APPLICATION NO. | : 17/029281 | |
| DATED | : February 21, 2023 | |
| INVENTOR(S) | : Chuh-Yung Chen et al. | |

It is certified that error appears in the above-identified patent and that said Letters Patent is hereby corrected as shown below:

On the Title Page

Item (30) should be added as follows:
Foreign Application Priority Data
October 18, 2019 (TW)............................ 108137741

Signed and Sealed this
Thirtieth Day of May, 2023

*Katherine Kelly Vidal*

Katherine Kelly Vidal
*Director of the United States Patent and Trademark Office*